J. LIEBERHERR AND R. BRUNNER.
WORKING MACHINE.
APPLICATION FILED NOV. 5, 1921.

1,438,443.

Patented Dec. 12, 1922.

WITNESSES
Paul Metzler
Karl Miller

INVENTORS
Jakob Lieberherr
Richard Brunner

Patented Dec. 12, 1922.

1,438,443

UNITED STATES PATENT OFFICE.

JAKOB LIEBERHERR AND RICHARD BRUNNER, OF ISLIKON, SWITZERLAND.

WORKING MACHINE.

Application filed November 5, 1921. Serial No. 513,147.

*To all whom it may concern:*

Be it known that we, JAKOB LIEBERHERR and RICHARD BRUNNER, citizens of Switzerland, residing at Islikon, Switzerland, have invented certain new and useful Improvements in Working Machines (for which we have filed an application for patent in Germany June 18, 1921), of which the following is a specification.

Our invention relates to working machines and has for its object to use the present machine for different purposes for instance, as a machine for drilling holes, as ventilator, as atomizer, etc.

Reference is to be had to accompanying drawing. It shows—

Figure 1:
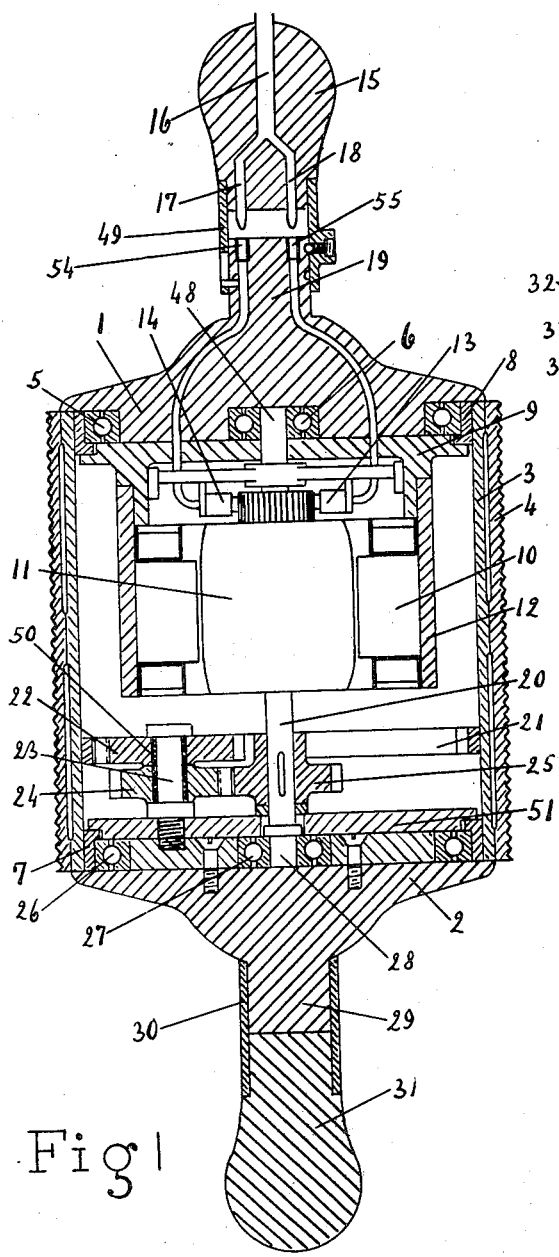

Fig. 1 a section through the machine, using the outside shell for scratching the drapery off from the walls of a room.

Figure 2:
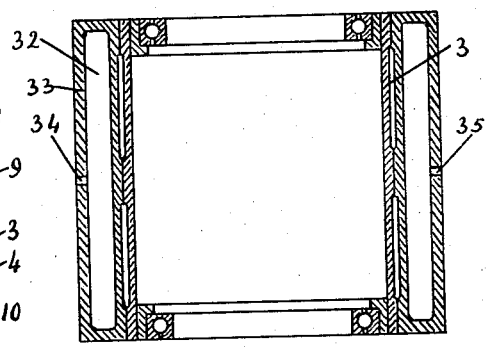

Fig. 2 a section through the hollow shell, filled with water for moistening the air.

Figure 3:
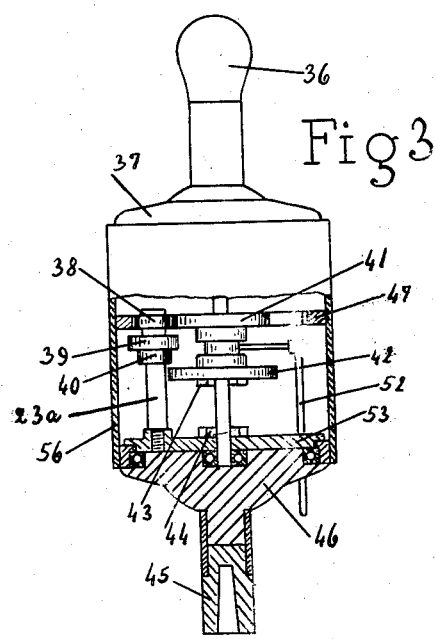

Fig. 3 a partial section and a partial view of a machine, which is used for drilling holes.

According to Figure 1 the armature 11 of an electrical motor is placed on the shaft 20. Both ends 20 and 48 of the shaft rest in the ball bearings 6 and 27. The pole pieces 10, with the field spools are fixed to the frame 12. The latter, which carries the brushholder 14, is fixed to the disc 9, which is connected with the cover 1. In the cover 1 the ball bearing 5 with the ring 8 is placed. The latter has an offset, which rests between the cover 1 and disc 9. The shell 3 is connected with the ring 8. The cylinder 4, which is removable and fitted with grooves, is placed on the shell 3. The cover 1 carries the yoke 19 with the electrical wires for the brushes. The wires are fixed to the sockets 54, 55. The connecting pieces 17, 18, which carry the current from the line through the cable 16, have to be pushed into the sockets 54, 55 when the machine is intended to work. The cable 16 is placed in the handle 15. The yoke 19 and the handle 15 are fitted with a pipe 49, which carries the stopping device. The shell 3 is connected with an internal spur gear 21, which works together with the spur gear 22. The spur gears 22 and 24 are placed on the bushing 50 and therefore both gears work together and rotate on the pin 23, which is fixed to the disk 51. The spur gear 25 is fastened to the shaft 20 and works with the gear 24. The disk 51 and cover 2 are connected together. Between the disc 51 and cover the ball bearings 26 and 27 are placed. The ring 7 serves the same purpose as ring 8. The yoke 29 and the handle 31 rest in the pipe 30. The machine, described above, works in the following way.

The connecting pieces 17, 18 are pushed into the sockets 54, 55 and the holders 15, 31 are held by the hands. The electrical armature 11 rotates and drives the spur gears 25, 24 and 22. The spur gear 22 makes the internal spur gear 21 with the shell 3 rotate. The cylinder 4 fixed on the shell 3, will be used for doing work for instance cleaning walls from worn drapery, woodpieces and stones can be fashioned by this machine.

According to Figure 2 on the shell 3 a hollow shell 33 is placed with the space 32, which has the holes 34, 35.

The arrangement, described above, works in the following way. The space 32 is filled with water. By the centrifugal force the water is forced into the atmosphere through the holes 34, 35. If many small holes are used the water will be reduced to mist and the air will be mixed with atomized water. The space 32 may be filled also with lubricating oil. By the rotation of the shell the oil is driven to the places which have to be oiled, by centrifugal force.

According to Figure 3 the machine is the same as the construction according to Figure 1. Only the gearing is changed. The internal spur gear 47 works together with spur gear 38, which is connected with the gears 39, 40. These gears are placed on the shaft 23$^a$ fixed to the disk 53, which is connected with the cover 46. The motorshaft with the gears 41, 42 and the shifting rod 52 rest in the cover 46. The shifting rod 52 shifts the gears so that either 41 and 39 or 40 and 42 work together, according to the desired speed. At the same time the shifting rod 52 can shift the gears 41 and 42 so far that the offsets 43 and 44 are connected together. In this case the gears 41, 39 and 40, 42 are out of connection.

This construction can be used for different operations and works as follows:

Supposing the gears 39 and 41 work together, the machine will work just in the same way as in Figure 1. The handle 36 and the holder 45 are held by hands. Supposing, the handle 36 and the shell 56 are prevented from turning, the cover 46 will turn and if a drill is put into the holder 45, holes may be drilled. The speed of the drill can be changed by the gears 39, 41 and 40, 42. In case a high velocity is required, the gears are disconnected and the offsets 43, 44 are connected. The rotation of the armature is directly transmitted to the cover 46 and the drill will have a high speed. In case fan blades are fastened to the holder 45 and the shell 56 with the handle 36 are fastened to a bearing, the whole construction may be used as a ventilator. Knives also may be fastened to the shell 56, so that wood pieces may be planed or fashioned. All kind of work can be done with this machine and instead of electrical power any other power may be used.

The connection between the shell, handle and holder is such that if any two are fixed in relation to each other, the other rotates, so that a recess may be reamed out by the shell and then a hole bored in its bottom by a bit in the tool holder.

We claim.

A machine comprising in combination an electric motor placed inside a shell having peripherical work treating devices; the shaft of the motor mounted in covers for the ends of the shell provided respectively with a handle and an axial tool holder, gearing connected the motor, shell and tool holder, and means for alternatively connecting the shell to the handle, or the tool holder to the handle, so that the motor through the gearing may alternately rotate the shell or the tool holder.

In witness whereof we affix our signatures.

JAKOB LIEBERHERR.
RICHARD BRUNNER.